United States Patent [19]

Lee et al.

[11] Patent Number: 5,050,525

[45] Date of Patent: Sep. 24, 1991

[54] GAMMA SURVEY PROBE FOR USE ON OCEAN, LAKE, ESTUARY AND RIVER SEDIMENTS

[75] Inventors: David R. Lee, Deep River; William J. Beattie, Petawawa, both of Canada

[73] Assignee: Atomic Energy of Canada Limited, Ottawa, Japan

[21] Appl. No.: 536,804

[22] Filed: Jun. 12, 1990

[30] Foreign Application Priority Data

Jul. 4, 1989 [CA] Canada ................................. 604746

[51] Int. Cl.⁵ ............................................ B63B 39/02
[52] U.S. Cl. ..................................... 114/244; 114/253
[58] Field of Search ................... 114/221 R, 242, 244, 114/245

[56] References Cited

U.S. PATENT DOCUMENTS 3,605,674  9/1971  Weese ................................. 114/245
3,868,623  2/1975  Abbott ................................ 114/244
4,535,716  8/1985  Hill .................................... 114/244
4,964,356 10/1990  Sullivan et al. ..................... 114/244

Primary Examiner—Sherman D. Basinger
Assistant Examiner—Stephen P. Avila
Attorney, Agent, or Firm—Judy A. Erratt; George E. Fisk

[57] ABSTRACT

An underwater gamma radiation survey probe adapted to be towed by a tow cable along the bottom of a body of water. The probe comprises a tubular shell with a nose cone having a waterproof connector for the tow cable. The nose cone closes one end of the tubular shell in a waterproof manner and an end plug closes the other end of the tubular shell in a waterproof manner. At least one weight of high density material is located in a lower half of the shell with that weight containing a cavity having an opening which faces the tubular shell. The weight maintains the orientation of the probe such that the opening faces downwards and a radiation detector in the cavity can detect radiation from the bottom surface.

20 Claims, 1 Drawing Sheet

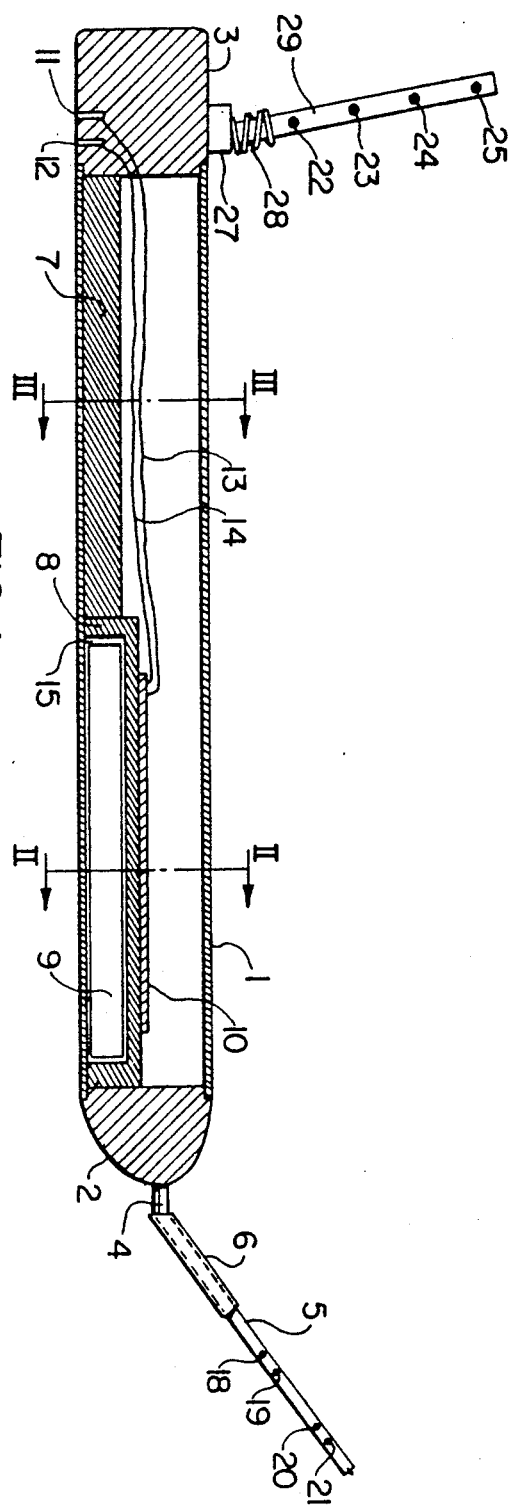
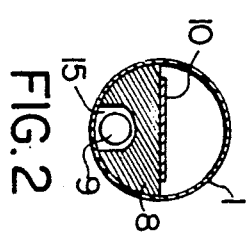
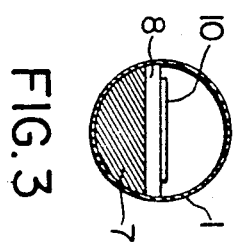
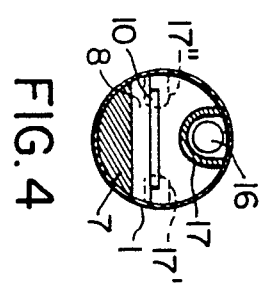

GAMMA SURVEY PROBE FOR USE ON OCEAN, LAKE, ESTUARY AND RIVER SEDIMENTS

FIELD OF THE INVENTION

The invention relates generally to an apparatus and a method for providing gamma radiation surveys of the bottoms of oceans, lakes or rivers over extensive areas.

BACKGROUND OF THE INVENTION

It has not been effectively possible to conduct an underwater survey for radionuclides over extensive bottom areas of oceans, lakes or rivers up to present. Radionuclides are generally mostly associated with sediments on the bottom and, as a result, cannot be detected through more than a few inches or feet of water. Gamma surveys of sediments on the bottom are at present done by coring because of the shielding effects of water. Coring is a point sampling approach and does not provide satisfactory coverage without enormous effort.

Sleds with radiation detectors may be used for special investigations since coring is unsuitable to cover large areas. However, sleds are prone to snagging, may tip over or even run upside down when being towed across the bottom from moving boats. Snagging of the sleds could result in a loss of the sled whereas any tipping of the sled results in the detector being shielded from the bottom by the additional depth of water or by the sled itself. This results in highly unreliable readings being obtained.

The majority of sleds presently used for underwater surveys are designed to operate at a predetermined distance above the bottom which makes them unsuitable for gamma surveys of the bottom.

U.S. Pat. No. 4,586,452 shows one type of tow vehicle for underwater sonar and/or TV survey systems wherein the tow vehicle is maintained at a fairly constant distance above the sea floor. A chain is attached to the tow cable at a predetermined distance from the tow vehicle, the chain being of sufficient weight to pull the buoyant tow vehicle downwardly in the water until the chain contacts the sea floor. The chain is then pulled over the sea floor and maintains the tow vehicle at a predetermined distance above the bottom as the vehicle and chain are towed by a vessel.

U.S. Pat. No. 4,426,950 shows another type of tow vehicle for surveying the water bottom by sonars and echo-sounders. That vehicle is maintained at, in this case, a predetermined depth from the surface of the water.

U.S. Pat. No. 4,298,840 shows an apparatus for determining electrical resistivities of various parts of a marine bottom. A flexible logging cable is towed by a vessel along the bottom of a body of water. A number of electrodes are located on the outer walls of the cable at spaced locations along the length of the cable with a first group of electrodes being current supply electrodes and electrodes of another group being measuring electrodes for measuring the potential differences between at least two pairs of electrodes.

SUMMARY OF THE INVENTION

It is an object of the invention to provide an underwater gamma radiation survey probe adapted to be towed along the bottom of a body of water which probe will avoid snagging on objects and which will remain oriented so that a radiation detector in the probe will be directed towards the bottom.

It is a further object of the invention to provide an underwater gamma radiation survey probe with a means to determine when the probe is in contact with the bottom of a body of water.

An underwater gamma radiation survey probe according to one embodiment of the invention comprises a tubular shell with a nose cone having a waterproof connector for a tow cable, the nose cone closing one end of the tubular shell in a waterproof manner and an end plug closing the tubular shell's other end in a waterproof manner, at least one weight of high density material being located in the lower half of the tubular shell, the weight containing a cavity having an opening which faces the tubular shell with a first radiation detector being located in said cavity and positioned to detect radiation through said opening.

In a further embodiment of the invention, said one weight is formed of lead and is located in a front portion of the tubular shell adjacent to the nose cone, a further weight of high density material extends between said one weight and said end plug, the further weight being solid and located in the lower half of the tubular shell.

In a still further embodiment of the invention, said one weight extends upward closer to a central axis of the tubular shell than said further weight providing said further weight with a lower center of gravity than that of said one weight.

In a still further embodiment, two spaced electrical conductance pins are flush with the lower surface of said end plug, the electrical conductance pins being electrically connected by leads to a printed circuit board in said tubular shell, the first radiation detector being electrically connected to said board and electrical leads in said tow cable being electrically connected to the printed circuit board.

In a still further embodiment, at least one further radiation detector is located in said tubular shell, a U-shaped radiation shield surrounding said further radiation detector with an open end of the U-shape shield fitting against the tubular shell and positioned so that said further radiation detector detects radiation in a different direction from that of said first radiation detector.

BRIEF DESCRIPTION OF THE DRAWINGS

The present invention will now be described in more detail with reference to the accompanying drawings, wherein;

FIG. 1 shows a partial cross-sectional view of a gamma survey probe according to present invention, FIG. 2 is a view taken on line II—II of FIG. 1, FIG. 3 is a view taken on line III—III of FIG. 1 and FIG. 4 is a view of a further embodiment taken on line III—III.

DETAILED DESCRIPTION OF PREFERRED EMBODIMENTS

FIG. 1 illustrates an underwater gamma survey probe, according to the present invention, consisting of a slim tubular body or shell 1 closed at one end with a nose cone 2 and at the other end with an end plug 3 which are connected to the tubular body 1 in a waterproof manner. The body 1 and nose cone 2 may be made of stainless steel whereas the end plug 3 may be made of a plastic material such as PVC. The tubular shell 1 can be replaced when it is necessary due to damage caused by being towed along the bottom of a body of water.

The nose cone 2 has a rounded front which is provided with a waterproof connector 4 to which a towing cable 5 is attached so that the probe can be towed along the bottom of an ocean, river or lake bed. A plastic abrasion guard 6 surrounds the lower portion of the cable to prevent damage to the cable as the probe is towed along the bottom of a body of water. The slim tubular shape and rounded nose cone help prevent the probe from snagging on objects.

A lead weight 7 is located in the bottom rear portion of tubular body 1 and another lead weight 8 with a cavity 15 is located in the front bottom portion of the tubular body 1. Cavity 15 is lined with a suitable shock absorbing material such as neoprene. A gamma radiation detector 9 is located inside cavity 15 whose opening faces downward. The detector 9 is electrically connected to a circuit board 10 which is located above lead weight 8. That lead weight 8 acts as a radiation shield for detector 9 which can detect radiation penetrating through the tubular shell 1 into the cavity 15 i.e. from the bottom surface of a body of water through which the probe is towed. If required a waterproof window of a material that is more transparent to gamma radiation may be located in tubular body 1 beneath detector 9. The detector 9 may be a geiger detector or scintillation detector and shock absorbing padding can be located between the detector 9 and the inner surfaces of cavity 15.

A major feature of this instrument transport vehicle is the distribution of mass in the cylindrical probe which is heavy at the base or lower portion of the probe but light on top. The lead weights 7 and 8 serve to orient tubular body 1 as it is being towed along the bottom of a body of water and to maintain detector 9 in a position so that it is looking downward. Although shield 8 could be extended to the rear of tubular body 1, to maintain the orientation of the tubular body, an additional weight 7 is preferred. The addition weight 7 has a lower center of gravity due to cavity 15 in weight 8 which weight extends upwards closer to the central axis than weight 7. The remaining top areas in tubular body 1 may be left empty or filled with a substance such as PVC or oil.

The end plug 3 contains two electroconductive pins 11 and 12 which are flush with the lower surface of plug 3 and which are connected to a printed circuit board 10 via leads 13 and 14. Leads (not shown) connect detector 9 to the board and leads from the printed circuit board extend to the surface inside cable 5. When the probe is not located on the bottom, pins 11 and 12 will indicate one conductivity since they are outwardly surrounded by water. However, as soon as pins 11 and 12 touch the bottom of a body of water they will sense a different conductivity due to being in contact with bottom sediments. These pins 11 and 12 can, as a result, be used to indicate when the gamma survey probe is in contact with the bottom surface. The pins 11 and 12 are supplied with alternating electrical pulses to prevent elements being electrodeposited onto the pins. In addition, as the gamma probe is towed along the bottom, the pins are dragged through the bottom sediment which serve to scrape the surface of pins 11 and 12 and keep them clean. These pins can also be used to detect heavy liquid contaminates laying on the bottom surface due to those contaminates having a different electrical conductivity than water or the bottom sediments.

Although FIG. 1 has shown only one gamma radiation detector 9, a number of detectors may be located in tubular body 1. These additional detectors may have various directions of detection. For instance, FIG. 4 shows a detector 16 with U-shaped lead shielding 17 positioned so that it detects radiation penetrating the top surface of tubular body 1. The dotted lines 17' and 17'' indicate additional positions for detectors which are orientated so they can detect radiation penetrating the sides of the tubular body.

When the probe is being towed along a bottom which is covered with soft sediments, it can sink into those sediments. Electrical conductance pins, similar to those which served to indicate contact with the bottom sediments, can be used to indicate the depth the probe has sunk into the sediments. Electrical conductance pins 18 to 21 may be placed at specific location along the cable for that purpose or pins 22 to 25 along a wand 29 attached to the upper surface of the probe 1 by a connector 27. A stiff spring 28 between connector 27 and wand 29 allows the wand 29 to be deflected if it encounters immovable objects while the probe is being towed. These are used in the same manner as pin 11 and 12 to indicate when they are in contact with the sediment and, since the angle of the cable is approximately known, the depth that the gamma survey probe has sunk into the sediments can be determined by which pins are in contact with the sediment. The electrical conductance information obtained from these pins can also be used to estimate the ionic strength of the porewater in the sediment.

Various modifications may be made to the preferred embodiments without departing from the spirit and scope of the invention as defined in the appended claims. For instance, temperature sensors and pressure sensors for depth readings may be added to this gamma survey probe. This probe may also serve as a means for transporting other types of sensors along and through the bottom sediments. Furthermore, the probe can include a water sampling intake screen through which water samples can be drawn into a tube and pumped to the surface for analysis or to an analyzer in the probe. Samples may also be taken at locations of interest and stored in suitable containers in the probe for latter analysis.

What is claimed is:

1. An underwater gamma radiation survey probe adapted to be towed by a tow cable along the bottom of a body of water; the probe comprising a slim tubular shell with a nose cone having a waterproof connector for the tow cable, the nose cone closing one end of the tubular shell in a waterproof manner and an end plug closing the tubular shell's other end in a waterproof manner, at least one weight of high density material being located in a lower half of the tubular shell, the weight containing a cavity having an opening which faces the tubular shell with a first radiation detector being located in said cavity and positioned to detect radiation through said opening.

2. An underwater gamma radiation survey probe as defined in claim 1, wherein said one weight is formed of lead and is located in a front portion of the tubular shell adjacent the nose cone, a further weight of high density material extends between said one weight and said end plug, the further weight being solid and located in the lower half of the tubular shell.

3. An underwater gamma radiation survey probe as defined in claim 2, wherein said one weight extends upward closer to a central axis of the tubular shell than said further weight providing said further weight with a lower center of gravity than that of said one weight.

4. An underwater gamma radiation survey probe as defined in claim 3, wherein said nose cone and said tubular shell are formed of stainless steel and said end plug is formed of a plastic material.

5. An underwater gamma radiation survey probe as defined in claim 4, wherein two spaced electrical conductance pins are flush with the lower surface of said end plug, the pins being electrically connected by leads to a printed circuit board in said tubular shell, the first radiation detector being electrically connected to said board with electrical leads in said tow cable being electrically connected to the printed circuit board.

6. An underwater gamma radiation survey probe as defined in claim 5, wherein at least one further radiation detector is located in said tubular shell, a U-shaped radiation shield surrounding said further radiation detector with an open end of the U-shaped shield fitting against the tubular shell and positioned so that said further radiation detector detects radiation in a different direction from that of said first radiation detector.

7. An underwater gamma radiation survey probe as defined in claim 6, wherein an abrasion guard is located on said tow cable adjacent said waterproof connector.

8. An underwater gamma radiation survey probe as defined in claim 7, wherein further electrical conductance pins are spaced along a portion of said tow cable above the abrasion guard.

9. An underwater gamma radiation survey probe as defined in claim 7, wherein a wand is attached to an upper rear surface of the probe, the wand extending upwardly and rearwardly with a plurality of electrical conductance pins being spaced along the wand.

10. An underwater gamma radiation survey probe as defined in claim 9, wherein a stiff spring attaches the wand to a connector on the survey probe.

11. An underwater gamma radiation survey probe as defined in claim 8, wherein a pressure sensor and temperature sensor are located on said probe.

12. An underwater gamma radiation survey probe as defined in claim 9, wherein a pressure sensor and a temperature sensor are located on said probe.

13. An underwater gamma radiation survey probe as defined in claim 5, wherein the tubular shell's remaining space is filled with a plastic material.

14. An underwater gamma radiation survey probe as defined in claim 5, wherein the tubular shell's remaining space is filled with oil.

15. An underwater gamma radiation survey probe as defined in claim 1, wherein the probe includes a pressure sensor to provide depth readings.

16. An underwater gamma radiation survey probe as defined in claim 15, wherein the probe includes a temperature sensor.

17. An underwater gamma radiation survey probe as defined in claim 16, wherein the probe includes a water sampling intake screen through which water samples can be drawn into a tube and transported to an analyzer.

18. An underwater gamma radiation survey probe as defined in claim 6, wherein the tubular shell's remaining space is filled with a plastic material.

19. An underwater gamma radiation survey probe as defined in claim 6, wherein the tubular shell's remaining space is filled with oil.

20. A method of surveying the bottom of a body of water with a gamma radiation detector comprising; towing an underwater gamma radiation survey probe along said bottom, the probe being tubular and containing a radiation detector, radiation shielding surrounding a portion of said detector so that said detector detects radiation from mainly one direction, means in said probe to maintain the orientation of the probe so that said one direction is downward and means in said probe to determine when said probe is in contact with said bottom.

* * * * *

UNITED STATES PATENT AND TRADEMARK OFFICE
CERTIFICATE OF CORRECTION

PATENT NO. : 5,050,525

DATED : September 24, 1991

INVENTOR(S) : David R. Lee and William James Beattie

It is certified that error appears in the above-identified patent and that said Letters Patent is hereby corrected as shown below:

On the title page, item [73] the Assignee:

"ATOMIC ENERGY OF CANADA LIMITED, OTTAWA, JAPAN"
should read --ATOMIC ENERGY OF CANADA LIMITED, OTTAWA, CANADA--.

Signed and Sealed this

Second Day of March, 1993

Attest:

STEPHEN G. KUNIN

*Attesting Officer*   Acting Commissioner of Patents and Trademarks